United States Patent
Alcantar

(10) Patent No.: US 12,052,953 B1
(45) Date of Patent: Aug. 6, 2024

(54) BIO-ENRICHED SOIL TECHNOLOGIES (BEST)

(71) Applicant: University of South Florida, Tampa, FL (US)

(72) Inventor: Norma Arcelia Alcantar, Tampa, FL (US)

(73) Assignee: University of South Florida, Tampa, FL (US)

( * ) Notice: Subject to any disclaimer, the term of this patent is extended or adjusted under 35 U.S.C. 154(b) by 40 days.

(21) Appl. No.: 17/222,653

(22) Filed: Apr. 5, 2021

Related U.S. Application Data

(60) Provisional application No. 63/004,924, filed on Apr. 3, 2020.

(51) Int. Cl.
| | |
|---|---|
| *A01G 24/22* | (2018.01) |
| *A01G 24/00* | (2018.01) |
| *C09K 17/50* | (2006.01) |

(52) U.S. Cl.
CPC ............. *A01G 24/00* (2018.02); *A01G 24/22* (2018.02); *C09K 17/50* (2013.01)

(58) Field of Classification Search
None
See application file for complete search history.

(56) References Cited

U.S. PATENT DOCUMENTS

| | | |
|---|---|---|
| 4,762,545 A | 8/1988 | Youssef et al. |
| 4,927,447 A | 5/1990 | Youssef et al. |
| 6,286,254 B1 | 9/2001 | Obonai et al. |
| 6,699,707 B1 | 3/2004 | Hince |
| 7,943,049 B1 | 5/2011 | Alcantar et al. |
| 9,163,374 B2 * | 10/2015 | Alcantar .................. B01J 20/24 |
| 9,776,895 B2 | 10/2017 | Alcantar et al. |
| 2003/0097864 A1 | 5/2003 | Montes et al. |
| 2021/0230473 A1 * | 7/2021 | Trahan .................... C08B 15/06 |

FOREIGN PATENT DOCUMENTS

| | | | | |
|---|---|---|---|---|
| CN | 100435633 C | | 11/2008 | |
| ES | 2277553 A1 | * | 7/2007 | ............. B01D 21/01 |
| JP | 2017096712 A | * | 6/2017 | |
| KR | 101358259 | * | 2/2014 | |
| MX | 2017002279 A1 | * | 8/2018 | |

(Continued)

OTHER PUBLICATIONS

Duane Gardiner, Peter Felker & Todd Carr (1999) Cactus extract increases water infiltration rates in two soils, Communications in Soil Science and Plant Analysis, 30:11-12, 1707-1712, DOI: 10.1080/00103629909370323 (Year: 1999).*

(Continued)

*Primary Examiner* — Charles R Nold
(74) *Attorney, Agent, or Firm* — Michele L. Lawson; Smith & Hopen, P.A.

(57) ABSTRACT

A bio-enriched soil and method of production is presented. If water supply is scant, bio-enriched soil technologies (BEST) are able to attract, store, and transport water and nutrient molecules to a plant in a controlled way. If the water or nutrient resources are excessive, BEST can release the excess and supply only what is needed. Hence, bio-enriched soil can function in climates in which crops normally are under stress by increasing the bioavailability of nutrients and water.

10 Claims, 10 Drawing Sheets

(56) References Cited

FOREIGN PATENT DOCUMENTS

SU          1080075      *   3/1984
TR       202100100 A2 *   2/2021

OTHER PUBLICATIONS

Chaudhary, T.N. et al. (1971). Water absorption by seeds as affected by soil temperature. Plant and Soil, vol. 35, No. 1 (Aug. 1971), pp. 189-192.

Gardiner, Duan et al. Cactus extract increases water infiltration rates in two soils, Communications in Soil Science and Plant Analysis (1999), 30:11-12, 1707-1712, DOI: 10.1080/00103629909370323.

Govaerts, Rafael. How Many Species of Seed Plants Are There? Taxon 50 (Nov. 2001), pp. 1085-1091.

Fox, Dawn I. et al. Removing heavy metals in water: the interaction of cactus mucilage and arsenate (As(V)), Environmental Science and Technology, 2012, 46(8):4553-4559.

English translation of foreign patent document CN100435633C granted on Nov. 26, 2008.

Young, Kevin Andrew et al. The Mexican Cactus as a New Enviornmentally Benign Material for the Removal of Contaminants in Drinking Water. Mater. Res. Soc. Symp. Proc. vol. 930, 2006.

Buttice, Audrey L. et al. Removal of Sediment and Bacteria from Water Using Green Chemistry. Environ. Sci. Technol. 2010, 44, 3514-3519.

Stebbins, Daniela et al. Cactus Mucilage as an Emergency Response Biomaterial to Provide Clean Drinking Water. Conference Paper for AIChE Annual Meeting, Oct. 2011. DOI: 10.1016/B978-0-444-59395-5.00010-8.

Young, Kevin et al. Using The Mexican Cactus as a Natural-Based Process for Removing Contaminants in Drinking Water. Polymeric Materials: Science & Engineering 2005, 93, 965.

Young, Kevin Andrew. The Mucilage of Opuntia Ficus Indica: A Natural, Sustainable, and Viable Water Treatment Technology for Use in Rural Mexico for Reducing Turbidity and Arsenic Contamination in Drinking Water. (2006) University of South Florida Scholar Commons. Graduate School Theses and Dissertations.

* cited by examiner

BIO-ENRICHED SOIL TECHNOLOGIES (BEST)

CROSS REFERENCE TO RELATED APPLICATIONS

This application is a nonprovisional of and claims priority to U.S. Provisional Application No. 63/004,924 entitled "Bio-Enriched Soil Technologies (BEST)", filed Apr. 3, 2020, the contents of which are hereby incorporated by reference into this disclosure.

GOVERNMENT INTEREST

This invention was made with Government support under Grant No. 1512225, awarded by the National Science Foundation. The Government has certain rights in the invention.

FIELD OF INVENTION

This invention relates to soil. Specifically, the invention provides a soil which is bio-enriched with cactus mucilage.

BACKGROUND OF THE INVENTION

Agriculture is a far-reaching business that extends well beyond industries that most consider to be farm-related. For example, extracts from soy plants are used in many "non-farm" products, such as cosmetics and soaps. Thus, an event that affects farming also affects the general economy. Agriculture is a critical economic driver in every country. In fact, according to the U.S. Department of Agriculture, agriculture and related industries make up nearly 6% of the gross domestic product (GDP) in the U.S., which means that farming and farm-related industries contribute approximately $1 trillion to the economy. Moreover, nearly one third of U.S. jobs are in farming and farm-related industries (i.e., forestry and fishing and food, beverage, and tobacco production). The cost of food products represents about 13% of total household spending, less than only the costs of housing (33%) and transportation (17%). (Agriculture 2016). Although similar statistics exist for other developed countries, the economies of developing countries are much more dependent on agriculture, which is critical to job production, impact on national savings and investment, manufacture of staple goods and services, creation of manufacturing opportunities, and overall economic development and growth. (Meijerink 2007).

Water is essential to an endless number of systems and processes and thus needs to be applied efficiently. The downward movement of water plays a vital role in designing a sustainable irrigation system. Water use efficiency and water productivity need to be considered as irrigation due to increased competition for water use among industry, municipalities and agriculture could lead to a water shortage in the future. (Kandelas et al. 2011).

The rhizosphere is the layer of soil having the most influence on plant roots as nutritional and irrigation properties take place in this layer. (Hartmann et al. 2008; Gregory 2006). The rhizosphere may have various depths that are dependent on differing factors and properties. Root growth over a period of time causes soil compaction which results in the soil becoming less porous. Numerous organic compounds are excreted by plant roots with the result being these organic compounds accumulating in the rhizosphere.

Some studies found that the rhizosphere has a higher water content than other soil layers while other studies have found the opposite. (Daly et al. 2015). These contradictory results may be due to differing study conditions and differing regions in which the studies were conducted. (Moradi et al. 2011). Due to the complex nature of soil, it has proven difficult to separate the rhizosphere layer from other soil layers to measure different parameters as a number of processes occur in parallel spatially and temporally in the rhizosphere. As such, quantification of different hydraulic variables in the rhizosphere has remained difficult.

Quantification of different components of the soil water balance is necessary, particularly in water scarce regions as this quantification can be used as the foundation for effective irrigation scheduling and more productive water use. (Perea et al. 2016). Water efficient techniques can greatly impact subsurface soil structure and soil water balance. Important characteristics of soil water balance include irrigation, changes in soil holding capacity, transpiration, evaporation, water movement in root zone, and downward water movement. (Li et al. 2017). Various research has been conducted on quantification of the soil water balance. (Sun et al. 2006). Moisture in soil can be measured by several different methods including oven drying and neutron probe. (Evett et al. 2012).

A further complication to the quantification of the soil water balance is the influence of geophysical properties of the environment which have contributed to environmental and agricultural problems. (Naushad et al. 2016). Studies have shown that dumping sites, industries, and residential areas are among the leading causes of soil and ground water contamination. (Faisal et al. 2020). High concentrations of metals have been found in soil which ultimately decreases soil fertility and water holding capacity. (Naushad and Alothman 2015).

With regard to agriculture, the volume of water required for irrigation can be affected by the absorption of water by different seeds present in the soil, which may be a disadvantage when utilizing limited resources. For example, studies conducted on wheat and corn seeds found that these seeds increasingly absorb water when temperature is increased. Further, different kinds of seeds were found to have differences in the amount of water absorbed depending on the type of seed. (Chaudhary, Singh and Singh 1971).

Mucilage

Most plant species produce an exopolysaccharide, a polymer of mono- and polysaccharides and proteins bonded by glycosidic bonds, referred to as mucilage. Plants secrete the substance to slow water loss, aid germination, and store food. The tuna cactus (*Opuntia ficus indica*) mucilage comprises complex carbohydrates forming a neutral mixture of approximately 55 high-molecular weight sugar residues composed basically of arabinose, galactose, rhamnose, xylose, and galacturonic acid. The mucilage has the capacity to interact with organic and inorganic compounds such as metals, cations and biological substances.

Cacti are known for their high absorbance and storage of water. The roots of the cactus spread wide in the soil to ensure it absorbs a large amount of water. Mucilage is a substance produced by plants and is found heavily in cacti and flax seeds. Mucilage is capable of forming a separate system when combined with soil. (Knee et al. 2001).

Mucilage has the ability to change the hydraulic properties of soil by increasing the connection between the soil and the plant root thus increasing moisture content. (Carminati et al. 2010; Yang et al. 2010). Mucilage is known to have a high capacity to retain water and its use in the soil allows for moisture content in the soil to increase for a longer time period compared to soil without mucilage. (Capitani et al.

2013). The unique properties of mucilage allow plants to be more resistive to water-stress and water salinity conditions. However, it is unknown if increasing the amount of mucilage in the soil will reduce the need for irrigation water for plants and thus improve the water soil system.

Modeling

Modeling using mathematical equations is an effective method that has been used in many industries to solve and predict real-world problems. These simulation models can be further categorized into pore and root scale models, depending on the variable used. (Blunt et al. 2013). Pore models are based on different types of soil data and mathematical assumptions, such as the geometry of the pores and structural formation, and are used to solve problems on physical grounds.

Numerous computer models have been developed to simulate the downward and horizontal water flow in soil, however these models have been subject to limitations due to the lack of research in this area. (Ghanbarian-Alarijeh et al. 2010). Darcy's law relating the fluid potential energy as pressure, density, gravitational acceleration, elevation could describe the directionality of flow in one dimension. (Richards, L. A. (1931). "Capillary conduction of liquids through porous mediums". Physics. 1 (5): 318-333). Richards' equation is known as the base for hydrological models capable of simulating water movement in soil, ricks, and other media. (Buchan 2003).

Subsurface models are also important in predicting actual geological, soil, and ground water conditions. Vertical water flow, irrigation, and water holding capacity are dependent on soil conditions and there is a dire need to address these issues, particularly in agricultural areas. (Tsutsumi and Fujita 2008). Numerous models have been used to predict soil conditions to better manage irrigation scheduling. (ŠimHnek et al. 2003). The inventors use a COMSOL model to simulate different geophysical conditions by element analysis and partial differential equations to determine the soil water balance and change the system when mucilage is added to the soil.

In light of the shortcomings of the prior art, what is needed is a way to enrich the soil to effectively dispense water, particularly in water scarce regions.

SUMMARY OF INVENTION

The inventors have discovered that enriching soil with cactus mucilage optionally mixed with inorganic or organic molecules enhances and restores the ability of the soil to retain and provide nutrients and water. This bio-enriched soil increases the bioavailability of the essential plant growth components for subsistence and commercial crops which in turn improves food production, creates additional energy from biofuels and effectively dispenses water.

In an embodiment, a bio-enriched soil is presented comprising an amount of cactus mucilage incorporated into soil. The cactus mucilage may be obtained from *Opuntia ficus indica* (OFI). In some embodiments, at least one inorganic compound, at least one organic compound, or a combination thereof may be added to the bio-enriched soil. The at least one inorganic compound may be at least one macronutrient, at least one micronutrient, or a combination thereof.

The cactus mucilage may be present in the soil in a linear configuration, in a random configuration, or in a three-dimensional (3D) configuration.

In another embodiment, a method of enhancing soil is presented comprising: providing an amount of cactus mucilage; varying carrier volume and cactus mucilage concentration to optimize interactions between the cactus mucilage and the soil; and adding the cactus mucilage to the soil to produce a bio-enriched soil. In some embodiments, at least one inorganic compound, at least one organic compound, or a combination thereof may be added to the bio-enriched soil. The at least one inorganic compound may be at least one macronutrient, at least one micronutrient, or a combination thereof. The cactus mucilage is obtained from *Opuntia ficus indica* (OFI).

The cactus mucilage may be present in the soil in a linear configuration, in a random configuration, or in a three-dimensional (3D) configuration.

In a further embodiment, a method of modulating water and nutrient availability in soil is presented comprising: adding an amount of cactus mucilage to soil to form a bio-enriched soil and adding at least one nutrient to the bio-enriched soil wherein the cactus mucilage stores or releases the water and the at least one nutrient in response to soil conditions. A surface tension below surface tension of water enables the cactus mucilage capable of transporting compounds in liquid or solid environments.

The method may be further comprised of varying carrier volume and cactus mucilage concentration to optimize interactions between the cactus mucilage and the soil, particularly surface tension and osmotic mobility or salinity. The cactus mucilage may be obtained from *Opuntia ficus indica* (OFI).

The cactus mucilage may be present in the soil in a linear configuration, in a random configuration, or in a three-dimensional (3D) configuration.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
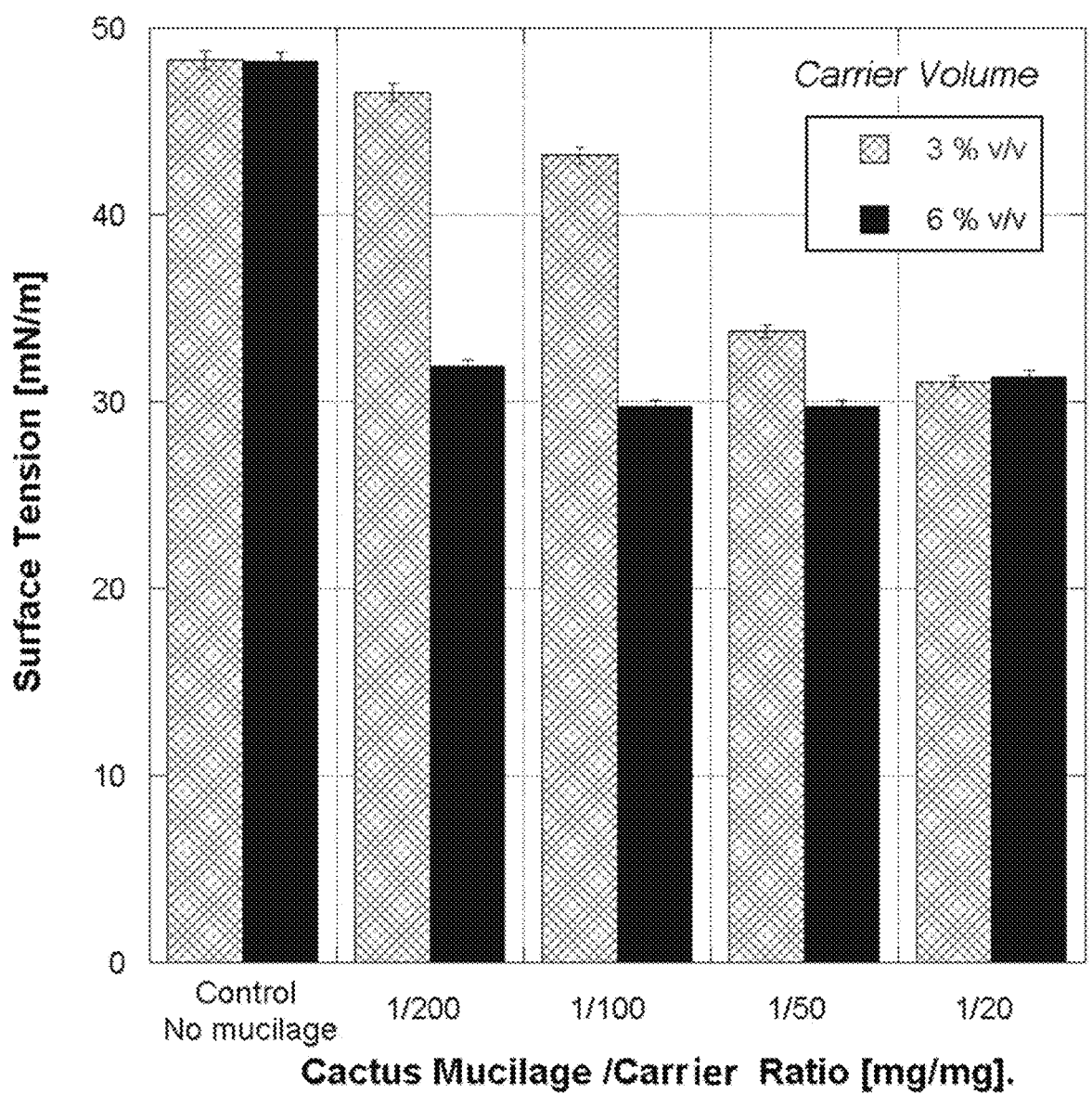
FIG. 1 is a graph depicting the surface tension of 3% and 6% carrier volumes as a function of mucilage concentration.

In the following detailed description of the preferred embodiments, reference is made to the accompanying drawings, which form a part hereof, and within which are shown by way of illustration specific embodiments by which the invention may be practiced. It is to be understood that other embodiments may be utilized, and structural changes may be made without departing from the scope of the invention.

Definitions

Unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are described herein. All publications mentioned herein are incorporated herein by reference in their entirety to disclose and describe the methods and/or materials in connection with which the publications are cited. It is understood that the present disclosure supercedes any disclosure of an incorporated publication to the extent there is a contradiction.

As used herein, the term "comprising" is intended to mean that the products, compositions and methods include the referenced components or steps, but not excluding others. "Consisting essentially of" when used to define products, compositions and methods, shall mean excluding other components or steps of any essential significance. "Consisting of" shall mean excluding more than trace elements of other components or steps.

As used in the specification and claims, the singular form "a", "an" and "the" include plural references unless the context clearly dictates otherwise.

All numerical designations, such as pH, temperature, time, concentration, and molecular weight, including ranges, are approximations which are varied up or down by increments of 1.0 or 0.1, as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include the individual values and sub-ranges within the indicated range, to the tenth of the unit. Thus, included in this numerical range are individual values such as 2, 3, and 4 and sub-ranges such as from 1-3, from 2-4 and from 3-5, etc. This same principle applies to ranges reciting only one numerical value. Furthermore, such an interpretation should apply regardless of the range or the characteristics being described.

All numerical designations, including ranges, are approximations which are varied up or down by increments of 1.0, 0.1 or 0.01, as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

The term "about" or "approximately" as used herein refers to being within an acceptable error range for the particular value as determined by one of ordinary skill in the art, which will depend in part on how the value is measured or determined, i.e. the limitations of the measurement system, i.e. the degree of precision required for a particular purpose. As used herein "about" refers to +10%.

"Optional" or "optionally" means that the subsequently described event or circumstance may or may not occur, and that the description includes instances where said event or circumstance occurs and instances where it does not.

As used herein, "plant mucilage" refers to a substance of polar glycoprotein, which may be extracted from the tissue and/or seeds of various plants such as the plants of the Cactaceae family. In some embodiments, the mucilage is obtained from the *Opuntia* spp such as *Opuntia ficus*-indica and *Opuntia cochenillifera*.

"Sustainable soil systems" ($S^3$) or "bio-enriched soil technologies" (BEST) as used herein refer to a system using bio-enriched soil to modulate bioavailability and use of water, macronutrients, micronutrients, or a combination thereof by plants to contribute to a more sustainable agriculture by making fertilizer and water use more efficient and cost-effective. "Sustainable soil systems" and "bio-enriched soil technologies" are used interchangeably herein.

"Soil" as used herein refers to the upper layer of earth in which plants grow which is generally comprised of unconsolidated minerals, water, gas, and organic material. Soil as used herein includes the A horizon (topsoil), the B horizon (subsoil) and the O horizon (organic), if present. Ideal soil for plant growth contains 50% pore space and 50% solids, with the pore space filled with equal parts water and air. Of the 50% solids, the ideal ratio is 45% mineral matter and 5% organic matter.

"Bio-enriched soil" as used herein refers to soil to which an amount of mucilage from the plants of the Cactaceae family has been added. Bio-enriched soil may also include at least one nutrient.

"Three-dimensional (3D) configuration" as used herein refers to a mucilage, or optionally a mucilage and nutrient (macro-, micro-, or a combination thereof) mixture, arranged in soil in a series of horizontal rows and vertical columns to produce a bio-enriched soil.

"Macronutrient" as used herein refers to elements used by plants in large amounts for plant growth and seed production. Exemplary macronutrients include, but are not limited to, carbon (C); hydrogen (H); oxygen (O); nitrogen (N); phosphorus (P); potassium (K); calcium (Ca); magnesium (Mg); sulfur (S); and combinations thereof. The macronutrients of C, O, and H are normally supplied to the plant by air and water. In some embodiments, individual ions of the macronutrients are used. In other embodiments, ionic compounds are used. Exemplary ionic compounds include, but are not limited to, ammonium nitrate; ammonium sulfate; calcium phosphate; and calcium sulfate.

"Micronutrient" as used herein refers to elements used by plants in small amounts for plant growth and seed production. Exemplary micronutrients include, but are not limited to, chlorine (Cl); iron (Fe); boron (B); manganese (Mn); zinc (Zn); copper (Cu); molybdenum (Mb); nickel (Ni); cobalt (Co); sodium (Na); silicon (Si); and combinations thereof. A balance of macronutrients and micronutrients is needed for healthy plant growth.

"Nutrient" as used herein refers to a substance used by plants to aid in growth and fertility. Nutrients include macronutrients, micronutrients, or combinations thereof.

"Inorganic compound" as used herein refers to a compound that does not contain carbon and is not a part of, or produced by, a living organism. Mineral elements are considered inorganic compounds. "Inorganic compound" and "inorganic molecule" are used interchangeably herein.

"Organic molecule" as used herein refers to a compound that contains carbon or is directly produced by a living organism. "Organic compound" and "organic molecule" are used interchangeably herein.

"Fertilizer" as used herein refers to a natural or synthetic substance that contains chemical elements and is added to soil to assist in plant growth and fertility. Both organic and inorganic fertilizers are contemplated, depending on the needs of the plants and soil. Organic fertilizers are derived directly from plant or animal sources while inorganic fertilizers are synthetic in that they typically undergo a manufacturing process. Inorganic fertilizers are in a form that is readily available for plant use while organic fertilizers may require conversion to an inorganic form by bacteria or fungi before the plant can use them.

"Pesticide" as used herein refers to a chemical substance or mixture intended to prevent, destroy, repel, control or mitigate any organism harmful to a plant. Pesticides include, but are not limited to, herbicides; insecticides; fungicides; disinfectants; compounds for controlling vermin such as rats and mice; and combinations thereof.

The main component of bio-enriched soil technologies (BEST) or sustainable soil systems ($S^3$) is cactus mucilage, the part of the cacti that is responsible for storing and transporting water and nutrients through the plant's capillaries. BEST is capable of enhancing food and energy crop productivity in a variety of climates and soil types through functionalizing the cactus mucilage with inorganic molecules, such as single ions or ionic compounds, and blending it into the soil to manage plant nutrient and water bioavailability through functionalized natural materials acting as sensors in the topsoil. Exemplary ions and ionic compounds useful herein include, but are not limited to, ions containing nitrogen (N), phosphorus (P) and potassium (K), calcium (Ca), magnesium (Mg) and sulfur (S) and their ionic compounds including, but not limited to, ammonium sulfate, ammonium nitrate, calcium phosphate and calcium sulfate. The inventor has previously shown that cactus mucilage is capable of purifying water by binding ions such as arsenic. (U.S. Pat. Nos. 7,943,049 and 9,776,895; Fox, D. et al., Removing heavy metals in water: the interaction of cactus mucilage and arsenate (As(V)), *Environmental Science and Technology,* 2012, 46(8):4553-4559, each of which is incorporated herein by reference).

The soil's physical and chemical properties, such as pH, alkalinity and salinity as well as its nutrient content often are the rate-limiting factors in commercial crops. Exemplary functionalized natural materials capable of acting as sensors include, but are not limited to, a system-like paper capable of capturing the pH and ionic strength of the soil which shows a change of color in response to the differences in ionic conditions. Sustainable soil systems are customized by integrating feedback and system thinking of the social, behavioral and economic sciences.

The following non-limiting examples illustrate exemplary systems and components thereof in accordance with various embodiments of the disclosure. The examples are merely illustrative and are not intended to limit the disclosure in any way.

Example 1—Bio-Enriched Soil

Developed functional cacti mucilage networks can produce a potentially superior soil capable of retaining and providing nutrients and water efficiently. Cactus mucilage from the *Opuntia ficus indica* (OFI) is an FDA-approved compound that is non-toxic (100% edible). This type of compound is already used in FDA-approved drugs (NDC Codes: 59535-0131-1, 59535-1311-1, 15631-0322-0, 15631-0322-1, 15631-0322-2, 15631-0322-3). (National Library of Medicine 2016).

If water supply is scant, sustainable soil systems ($S^3$) can attract, store, and transport water and nutrient molecules to a plant in a controlled manner. If the water or nutrient resources are excessive, $S^3$ can release the excess and supply only what is needed. Hence, $S^3$ soil can function in climates in which crops normally are under stress by increasing the bioavailability of nutrients and water. Cactus mucilage's natural ability to bind and release individual macronutrients, micronutrients and water can greatly contribute to a more sustainable agriculture by making fertilizer and water use more efficient and cost-effective.

Surface Tension

The preliminary data show that the surface tension (ST) is a parameter of interest to determine the ability of cactus mucilage to easily transport organic and inorganic nutrients, herbicides, or fertilizers. (Knoche 1994). The dimensions of ST are force per unit length. If ST values are lower than that of water (reference value: 72 mN/m at standard operating conditions), the system is capable of transporting compounds in liquid or solid environments.

FIG. 1 shows ST values as a function of two carrier volumes (e.g., hydrophobic/hydrophilic compounds ratio, 3% and 6% v/v). The carrier was water along with ions. Methodology for the experiments was conducted as described in Guo, F. et al., herein incorporated into this disclosure in its entirety by reference. (Guo, F. et al., Interfacial phenomena of natural dispersants for crude oil spills, *Langmuir,* 2019, 35(48): 15904-15913). At low values of carrier volume (3% v/v), the ST is a function of mucilage concentrations. Note that it is only at 1/20 of mucilage-carrier ratio [mg/mg] that the ST value is significantly lower (31 mN/m). If the carrier volume doubles to 6% v/v (increasing hydrophobicity), the ST values are fairly constant and considerably low (31.8 mN/m), even at significantly low concentrations of cactus mucilage of 1/200 mg/mg. This indicates that the interactions of mucilage with soil compounds can be optimized and finely-controlled depending on the carrier volume and cactus mucilage concentration.

Osmotic Mobility

Figure 2:
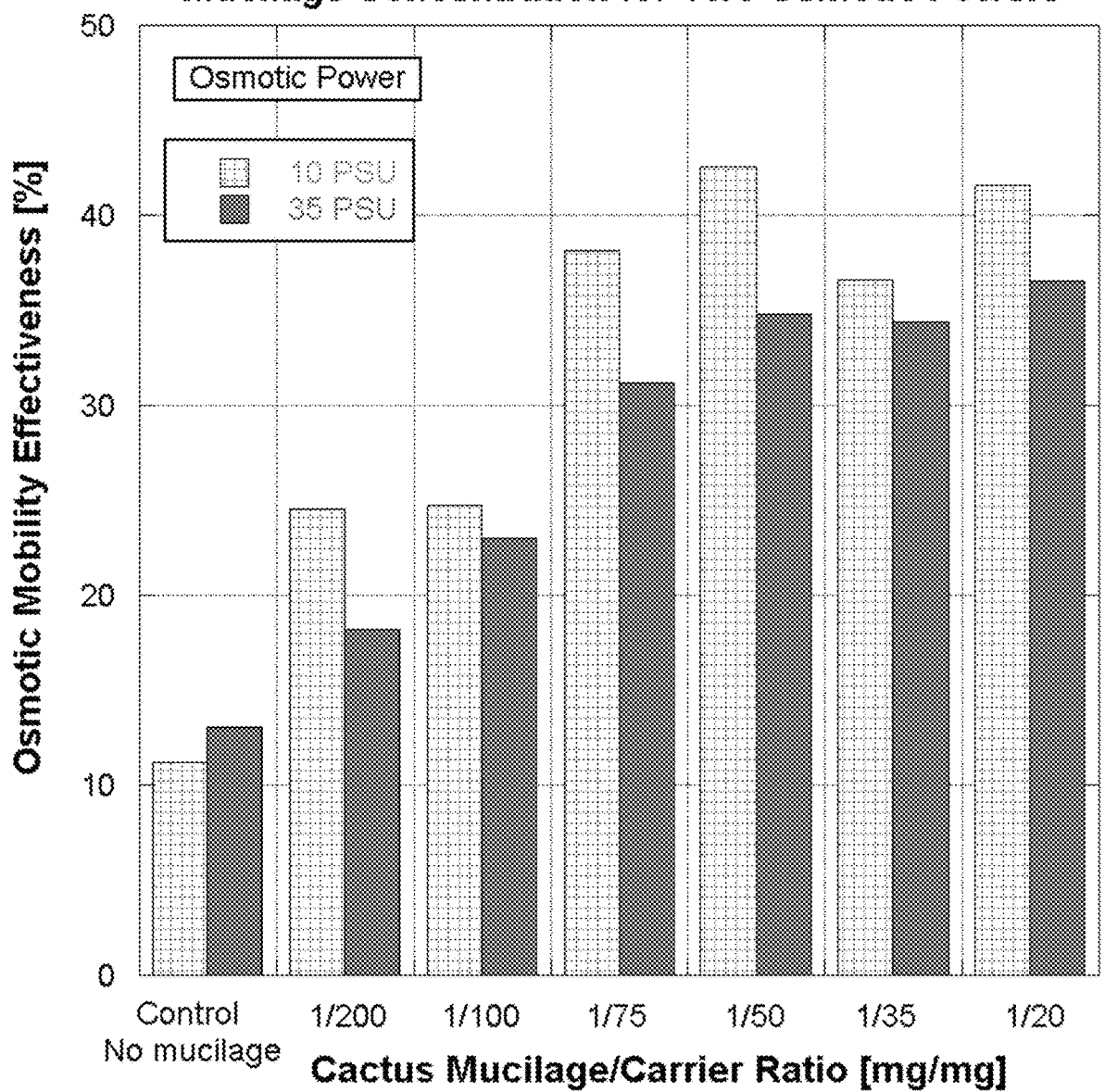
FIG. 2 is a graph depicting the effect of osmotic power at constant carrier volume (6% v/v) as a function of cactus mucilage concentration.

Similarly, the inventors have also monitored the behavior of the osmotic mobility effectiveness of cactus mucilage as a function of osmotic power (OP). OP is reported in terms of practical salinity units (PSU). Also known as salinity gradient power or blue energy, OP is the energy available from the gradients in salinity between two media. (Loeb 1975). The inventors measured the osmotic mobility effectiveness of cactus mucilage as a function of concentration for two osmotic powers (FIG. 2). That is, the motion of organic and inorganic compounds (keeping carrier volume constant at 6% v/v) increases as mucilage concentration increases until it reaches saturation between 1/75 and 1/50 ratios. The effect is greater for lower salinity (10 PSU) than for higher (35 PSU). The carrier was water along with ions. Methodology for the experiments was conducted as described in Guo, F. et al., herein incorporated into this disclosure in its entirety by reference. (Guo, F. et al., Interfacial phenomena of natural dispersants for crude oil spills, *Langmuir*, 2019, 35(48):15904-15913).

Mucilage Interactions

The inventors have also studied the interactions of mucilage with metals and found a significant binding with K, Fe, and Ca. (Stebbins 2013). These results indicate that the inventors are able to design and monitor how cactus mucilage promotes the mobility of nutrients, pesticides, and fertilizers depending on soil quality. Mucilage is a combination of polysaccharides. As such, mucilage is capable of transporting water via capillary forces back and forth depending on the pressure difference.

Cacti have been instrumental in providing clues about CAM (Crassulacean acid metabolism), which is when net $CO_2$ uptake for plant photosynthesis occurs at night with minimum water loss. (Nobel 1991). Learning from and emulating how a cactus plant efficiently allocates and provides water and nutrients through $S^3$ elucidates other biological processes involved in plant growth and survival.

Figure 3A:
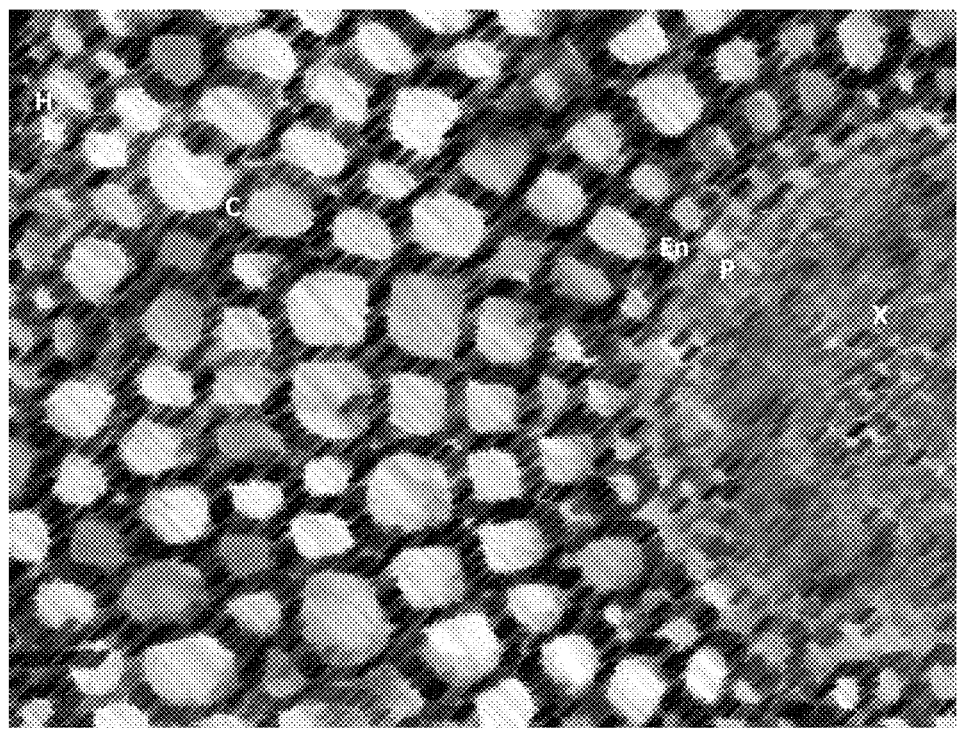
FIG. 3A is an image depicting median cross-sections of OFI root, showing its structure: inner cortex (C), including hypodermis (H); endodermis (En); pericycle (P); and xylem (X). Scale bar—50 μm. Adapted from Nobel (2002).
Figure 3B:
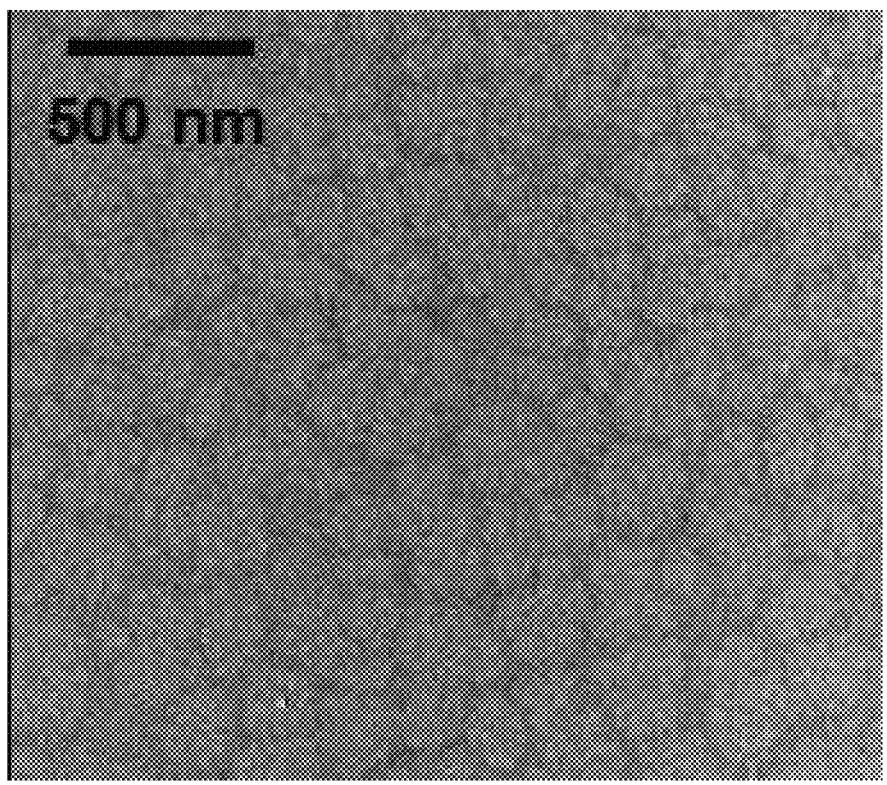
FIG. 3B is a Transmission Electron Micrograph (TEM) of non-gelling (NE) OFI cactus mucilage extract. Prepared from 500-ppm stock solution in ultra-pure water, then air-dried for imaging.
Figure 3C:
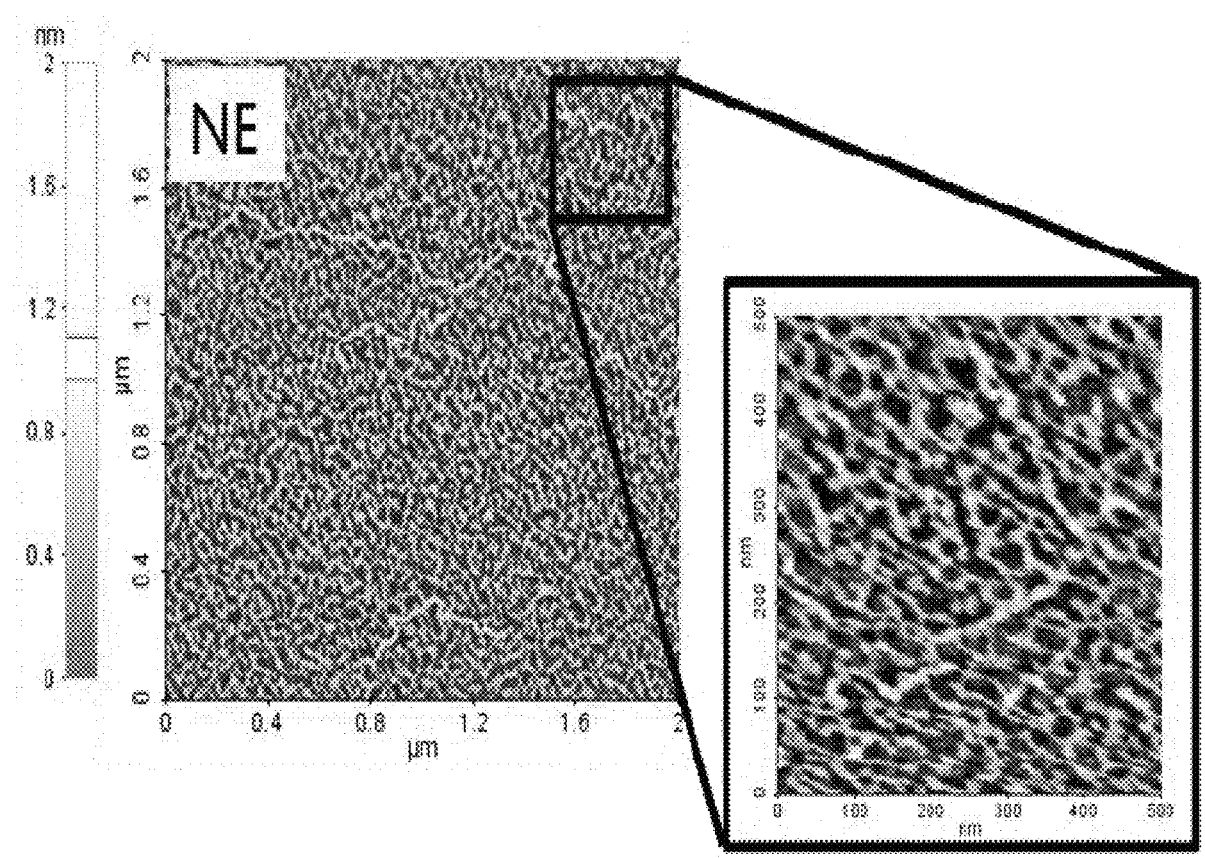
FIG. 3C is Atomic Force Microscopy (AFM) scans of NE cactus mucilage extracted from OFI drop deposited and air-dried on mica from stock solution of 500 ppm in ultra-pure water. Scan is 2×2 μm x-y. Inset is 0.5×0.5 μm with heights recorded up to 2.01 nm.

FIG. 3A-C illustrates the topographical structure of the mucilage embedded in the plant root (3A) as analyzed by Transmission Electron Microscopy (TEM) (3B) and Atomic Force Microscopy (AFM) (3C). (Nobel 2002; Buttice 2010; Fox 2012). Cactus mucilage has a flexible amphiphilic nature owing to their highly-elastic sugar groups. (Buttice 2010). That is, the carboxyl groups flip in and out of the backbone chain to accommodate hydrophobic or hydrophilic interactions depending on the chemistry of the surroundings.

The water transport in the mucilage is like pulling a string (cohesive water movement depends on capillary and intermolecular forces) through a long, narrow tubular straw. The structure of the mucilage facilitates the water movement by creating a difference in the osmotic pressure between its chains. Water transport is quantified by the radial and axial volume of water that moves across the cactus mucilage surface area due to a pressure gradient per unit time, also known as hydraulic conductivity or Lp. Reported values for OFI cactus (prickly pear cactus or nopal) range from 1.45+ 0.15 x10-7 ms-1 $MPa^{-1}$ depending on soil wettability. (Lopez 1991). This is also a measure of the energy per unit time (Joule/s) that drives water and ion movement in the radial and lateral directions and an estimate for the short-term intermolecular interactions between mucilage and water molecules. The Lp for OFI is extremely stable even though the soil water levels may be considerably different. For instance, Nobel and North (1994, 1996) reported that tissues of OFI displayed Lp values of $1.3-1.44 \times 10^{-7}$ ms-1 $MPa^{-1}$ for 3-month-old roots in 1-30 days of exposure to wet, drying, and rewetted soils. (North 1992). They also studied the ability of OFI to come back after being in draught conditions and observed that OFI tissues recovered 90% of their maximum Lp after only 7 days of being exposed to rewetted soil. (North 1996).

In the OFI cactus plant, once the water arrives to the inner cortex, it is stored by cactus mucilage (FIG. 3A). (Young 2006). An optimal flow of water and suction is required to obtain high efficiency in the water uptake, as water gradients are also created by the structure of mucilage and its assembly in the inner cortex and pith. (Nobel 2002). These remarkable characteristics of OFI mucilage compounds validate the use of these natural materials in soils. This material can be obtained at great scale using a combine harvesting device.

OFI is a succulent that exhibits a greater capacity for water storage and has the ability to withstand a high degree of dehydration without irreversible damage. (Nobel 2002). It also has the greatest net $CO_2$ uptake rate and total daily net $CO_2$ uptake of succulents because of the water stored in its cladodes (18 µmol $m^{-2}$ $s^{-1}$) and a high water-use efficiency of the CAM pathway (698 mmol $m^{-2}$ $day^{-1}$). (Cui 1994). In addition, OFI is the most widely-cultivated succulent worldwide and the best-studied species with respect to root development and structure. (Young 2006; Nobel 2002). The inventors have studied the macroscopic performance of OFI mucilage for its flocculation and surface active properties to remove contaminants from water for more than 12 years. (Young 2005; Young 2006). Contrary to slow-growing cacti, such as the Saguaro species (*Carnegiea gigantea*), OFI grows abundantly, even in arid environments. It has been reported that dry weight production of OFI between 20,000- 50,000 kg/ha/yr (1 ha=10,000 $m^2$) is typical in a cactus farm. (Nobel 1987).

A potential additional benefit is cactus mucilage's ability (based on the preliminary results) to bind organic compounds, which could serve the farmer's needs far more efficiently in administering pest control agents. (Buttice 2014; Fox 2016; Vecino 2016). Such chemicals are expected to bind to the mucilage in the soil, preventing washout by rainwater and hence becoming bioaccessible to crops for a more sustainable use of pesticides and insecticides that deliver maximum value to farmers while preventing pollution of the environment.

The inventors target food and energy crops, thus aiming at improving food and bioenergy productivity in a more sustainable society. This reduces the cost of crop production for food and energy applications and will improve profit margins of small farmers in particular. The socio-economic and geographic forces that drive susceptibility and acceptability are a critical part of the project for learning how to implement such systems.

Figure 4:
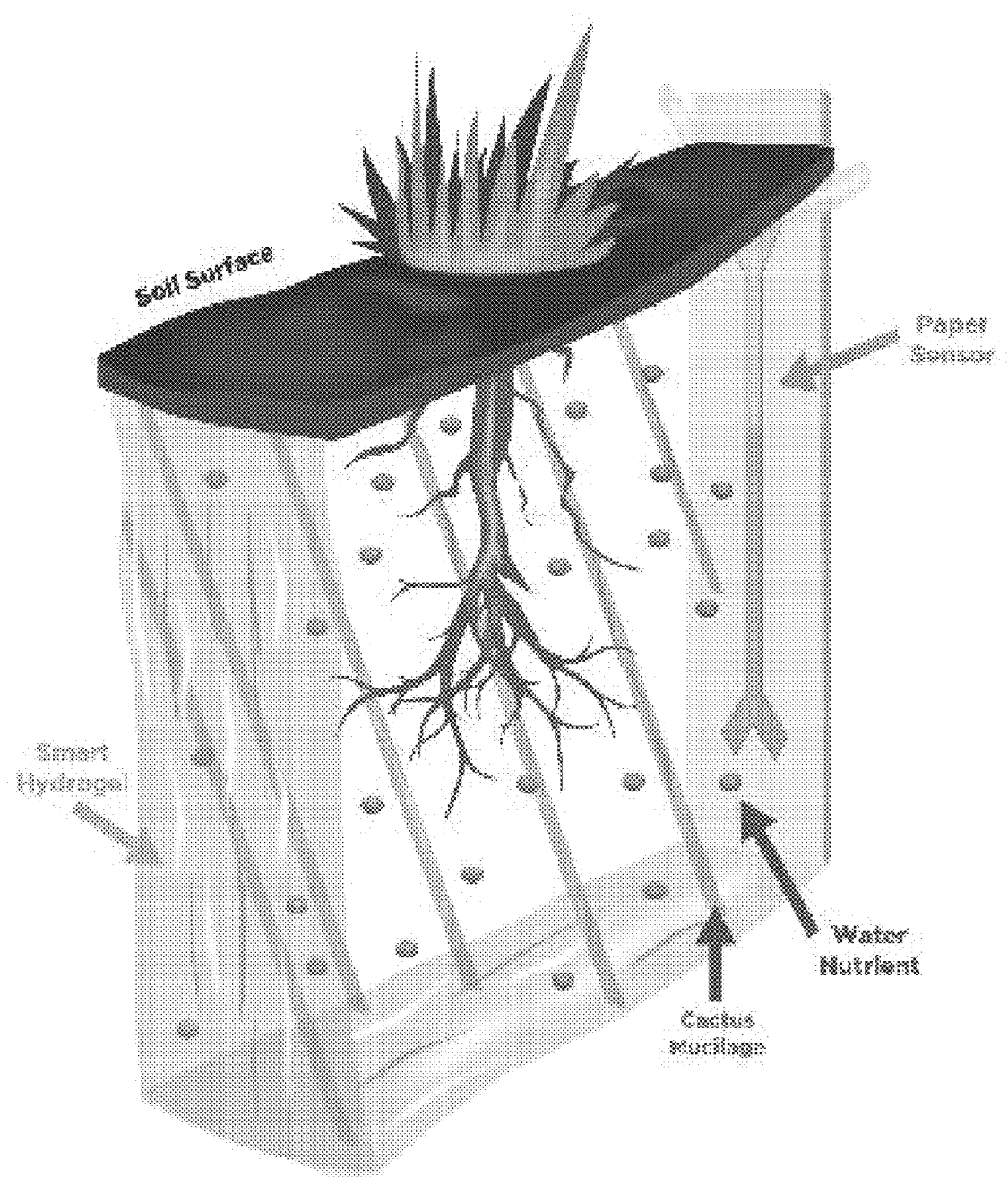
FIG. 4 is a schematic representation of a linear mucilage configuration.
Figure 5:
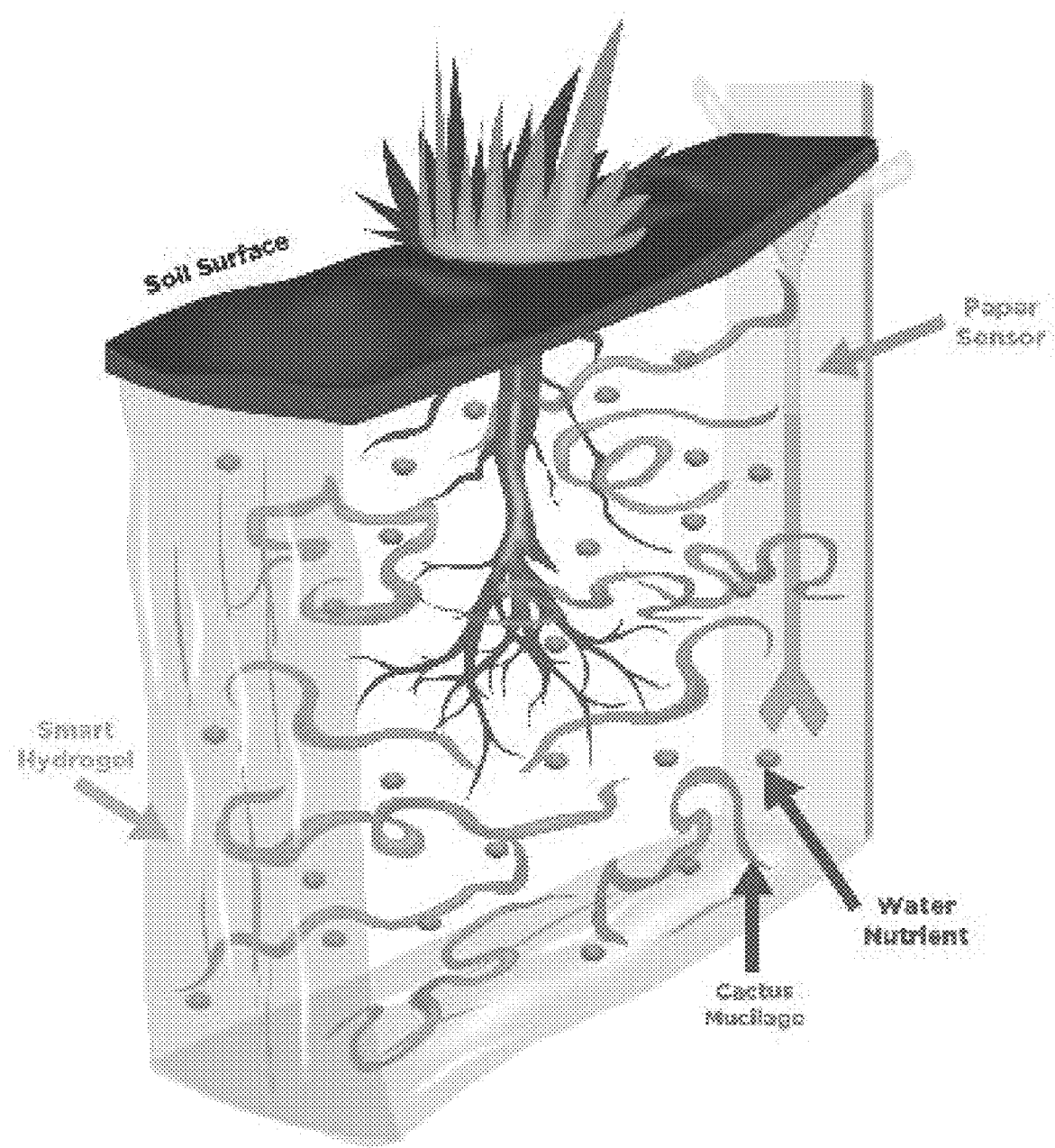
FIG. 5 is a schematic representation of a random mucilage configuration.
Figure 6:
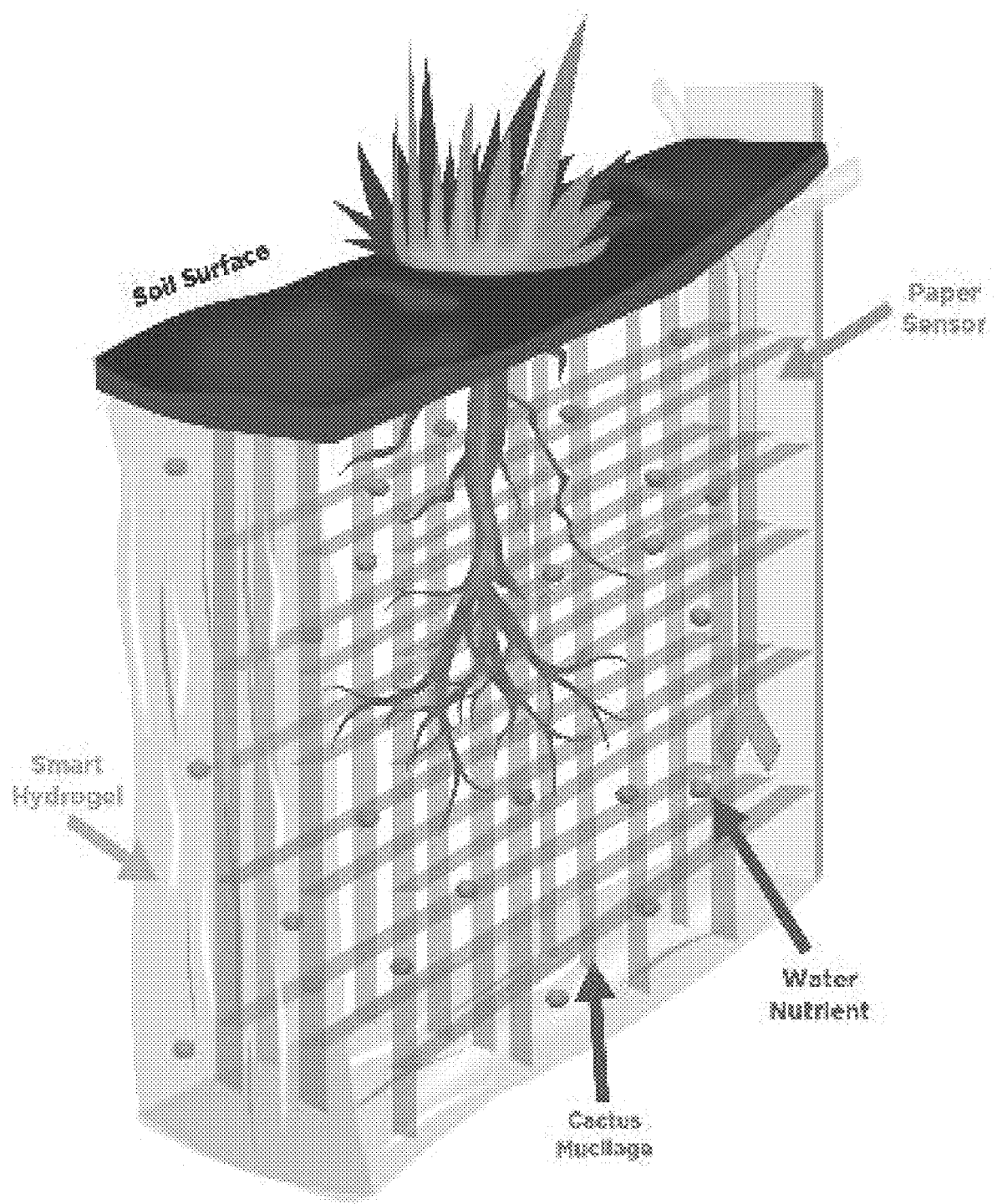
FIG. 6 is a schematic representation of a 3D cell mucilage configuration.

FIGS. 4-6 depict schematic representations of three different mucilage configurations. Each configuration achieves different levels of water and internal nutrient control and transport.

Example 2—Simulation Model of Soil Water Balance with Mucilage Addition

COMSOL is one of the best-known multi-physics models. COMSOL simulates different geophysical conditions by element analysis and partial differential equations. This example models the soil water balance and tracks a solute in groundwater flow for 1000 days to determine the transport and absorption of water with an emphasis on the mucilage. A powder represents the mucilage in the simulation to estimate how the soil water system changes in response to the addition of the mucilage.

Richards' equation, a nonlinear partial differential equation used to represent the movement of water in unsaturated soil, was used to calculate the absorption of water by the soil. The simulated model covered a square area of 4×4 $Km^2$.

Results

The simulated system was used to demonstrate whether or not the added mucilage assists the plant in absorbing water.

Figure 7:
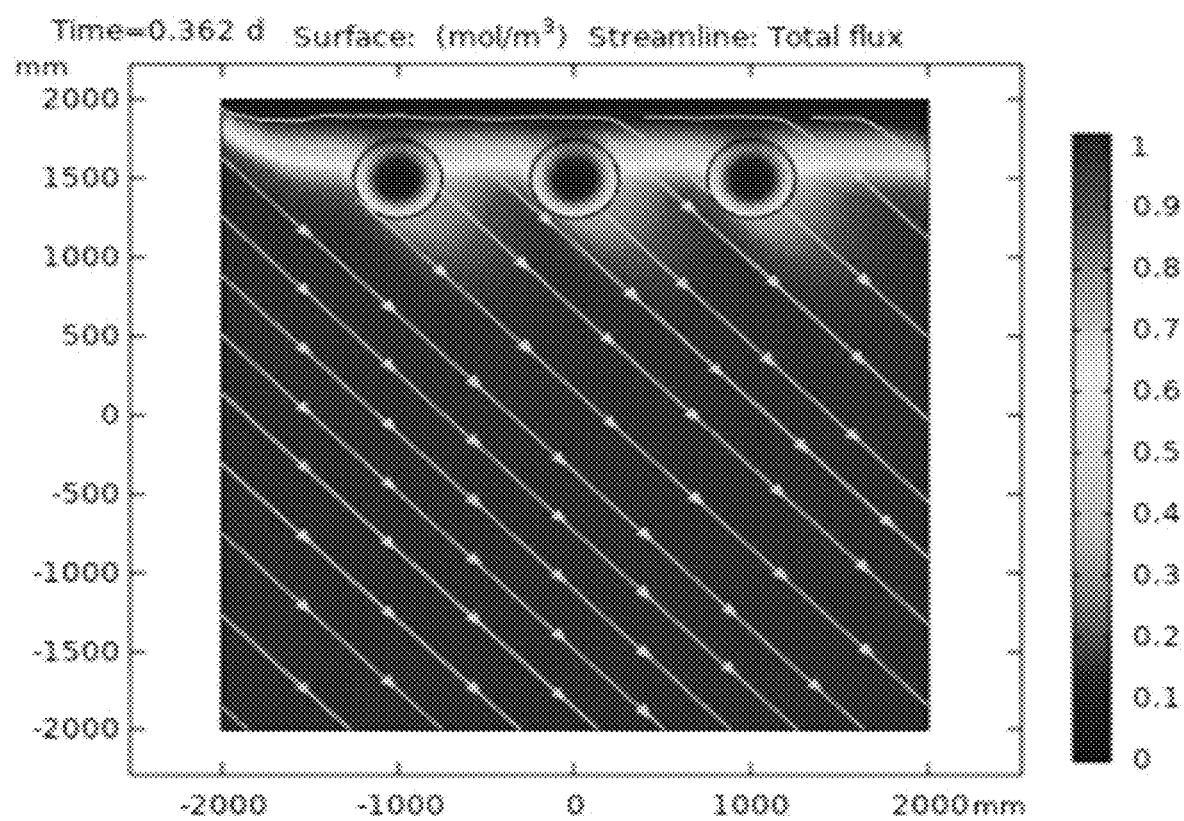
FIG. 7 is an image depicting the arrow surface velocity field plot. The arrows represent the direction of water flow.
Figure 8:
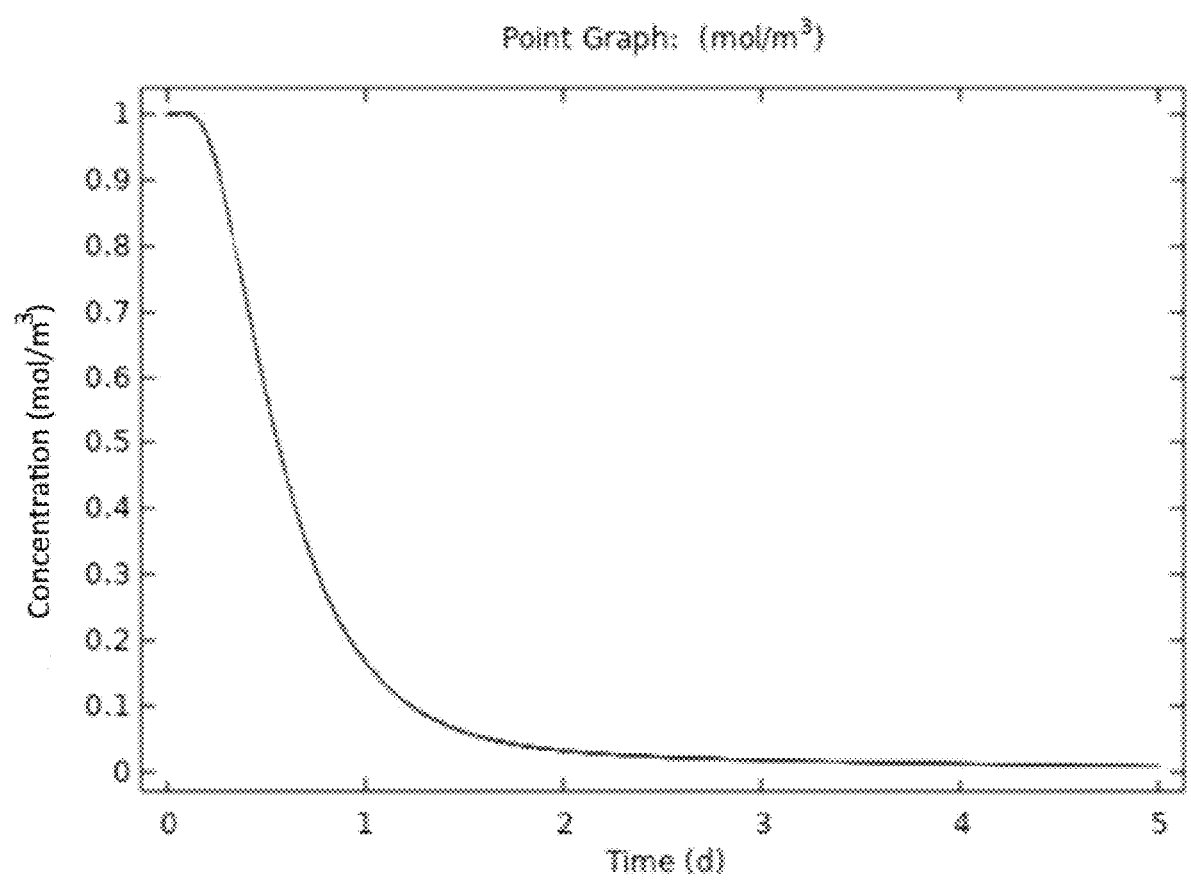
FIG. 8 is a point graph depicting the soil system concentration versus time.
Figure 9:
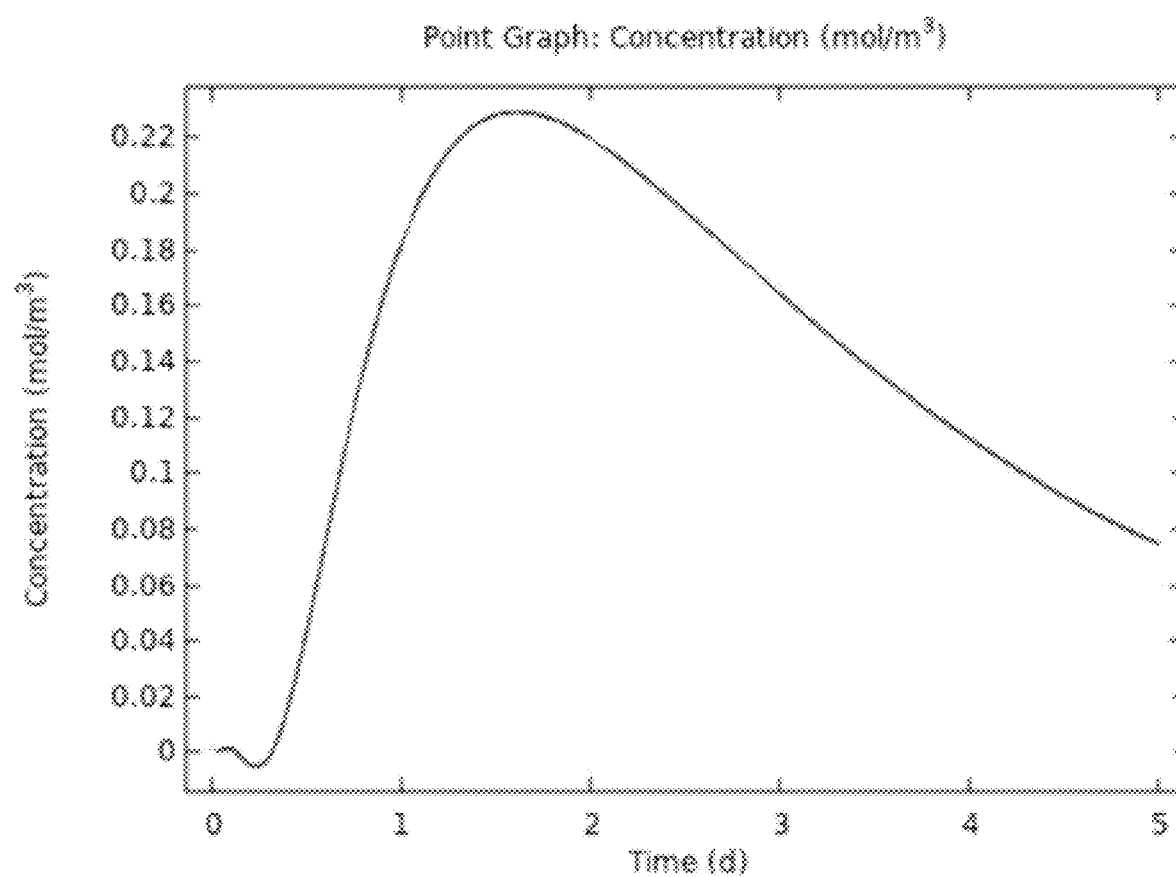
FIG. 9 is a point graph depicting individual particles concentration versus time.

An arrow surface plot was created which displays the flow of water within the soil after 1000 days. (FIG. 7). The circles signify added powder that was used to represent the mucilage of the plant. The black contour represents the simulated concentration distribution while the white contour represents previous analytical solutions. The arrows represent the direction of water flow. The simulation matches previous research and finds that seeds absorb their own share of water.

The COMSOL simulation included designing a transport system in porous media and calculating the water flow over a specified period of time. The simulation results matched the analytical solution. The results show that the seeds absorb their own share of water while in the soil.

The mucilage of the plant simulated was represented by powder at the center of the system. According to the simulation, the mucilage captures the water and stores it, which causes a slow reduction of the water in the soil over time. After the soil dries, water in the mucilage diffuses back to the soil, affecting the land or the plant root within the system, to allow the soil to become more humid again. As such, mucilage contributes to the storage of water within the plant.

Methods

The COMSOL software was used to model the soil water balance in a simulation and a solute was tracked for 1000 days to determine the transport and absorption of water and the affect of mucilage on water absorption.

Briefly, a transportation library file was created in which a 2D square was added as an object. The square was positioned in the center with a given length L. Physics was added to the application and the transport method was optimized to be "Transport of a Diluted Species in Porous Media" (TDS). A no-flux boundary condition was created. No-flux boundary is defined as there being zero flux in boundary nodes which allows for the velocity fluxes to only be calculated after completing the process, as in after Richards' equation is solved, as the hydraulic conductivity multiplied by the pressure head gradient averaged over the element containing a particular boundary node. (Neph 2008).

$$q = K\frac{dh}{dx} = 0 \quad (1)$$

where h is the elevation induced by capillary action; x is the elevation; K is the hydraulic conductivity; and q is the volumetric flow rate (water). Inflow and outflow boundaries are set with inflow boundaries set between 1 and 3 and outflow boundaries set between 2 and 4. This allowed for all transport parameters to be efficiently optimized.

Equation (2) below was inserted into the simulation in the Expression field:

$$\frac{1}{2\pi esrc^2}e^{-(x^2+y^2)/2esrc^2} \quad (2)$$

where x and y are metric dimensions for the size of the system. The whole term describes the moisture content, i.e. this is the solution for when water saturation is achieved. The arguments of the function were labeled as x and y. in the Units section, the arguments were m and the function was 1. Plot parameters for x and y have a lower limit of −2000 and an upper limit of 2000.

To simulate the physics of the system, initial values of TDS were accessed as units of 1 mol/m$^3$. Additional variables were defined such as name (c_analytic); expression (an1(x,y,t)); unit (mol/m$^3$); and description (analytic solution). The structure also required adjusting the size and inserting a mesh. The mesh was beneficial to resolve spatial distribution. Finer mesh of a high quality is preferred.

The model was built on the idea of simulating the system for 1000 days thus it must be time dependent. Inclusion of a restricted maximum time step increases the accuracy. In this system, the maximum step constraint was labeled as constant with the maximum step being 20.

Conclusion

The simulation illustrated that mucilage is capable of contributing to the storage of water within the plant and seeds absorb their own share of water when in the soil. The addition of mucilage to soil can assist in attracting, storing, and transporting water and nutrient molecules to a plant in a controlled manner.

Example 3—Linear Mucilage Configuration in Bio-Enriched Soil (Prophetic)

Cactus mucilage's natural ability to bind and release individual macronutrients, micronutrients and water can greatly contribute to a more sustainable agriculture by making fertilizer and water use more efficient and cost-effective.

A composition of cactus mucilage may be used which includes both gelling extract (GE) and non-gelling extract (NE) combined or alternatively, either GE or NE may be used individually.

Cactus mucilage can be extracted by various methods. The most common method uses water as a solvent for maceration, followed by a filtration process and precipitation. Other methods include use of a mechanical press with or without subsequent precipitation. Methods for extracting mucilage are known in the art as described in Gheribi et al., herein incorporated by reference into this disclosure. (Ghiribi, R. et al., 2019, Cactus mucilage for food packaging applications, *Coatings*, 9:655).

Extraction of Mucilage (First Method)

In an embodiment, mucilage is extracted from fresh cactus pads. The pads are washed, dried and weighed. The pads are diced or peeled and boiled for 20 min, then the mixture is liquidized in a blender. 1M sodium hydroxide (NaOH) is added to neutralize the mixture and then centrifuged to separate the supernatant (which contains the NE) from the solid precipitate (containing the GE). Before the GE is extracted, the non-gelling extract (NE) is removed. The GE is then extracted using an adaptation of a method developed by Turquois et al. (Turquois, et al. Extraction of highly gelling pectic substances from sugar beet pulp and potato pulp: influence of extrinsic parameters on their gelling properties. *Food Hydrocolloids* 1999, 13, (3), 255-262). The solids are mixed with 7.5 g/L sodium hexametaphosphate [(NaPO$_3$)$_6$] in 50 mM NaOH, in a 1:1 mass-to-volume ratio of solids to solution. The mixture is stirred for 1 h, then vacuum filtered with knitted polyester cloth or Whatman 41 filter paper to obtain the filtrate. The filtrate pH is lowered to 2 using hydrochloric acid (HCl) and refrigerated overnight (~ 5° C.) in order to precipitate the GE. The precipitate is separated by centrifugation, re-suspended in sufficient deionized (DI) water to cover the pellet, and the pH is adjusted to 8.0 with 1M NaOH to re-dissolve the precipitate. The resulting solution is purified by successive filtering through a 1.2 µm and a 0.45 µm membrane. The GE is re-precipitated with acetone or isopropanol in a 2:3 liquid-to-solvent volume-to-volume ratio, then is washed with alcohol and dried under ambient conditions.

The non-gelling extract (NE) is collected as described above, and sodium chloride is added to the supernatant to form a final concentration of 1M NaCl. The supernatant is filtered with knitted polyester cloth or Whatman 41 filter paper, based on the viscosity of the liquid, to obtain the filtrate. Acetone or isopropanol is added in a 2:3 volume-to-volume ratio of supernatant to solvent to precipitate the NE. The precipitate is washed with ethanol-water mixtures in a graded series (70%, 80%, 90%, 95% ethanol, and absolute ethanol) to remove any remaining impurities. The precipitate is left to dry at room temperature overnight, followed by an overnight drying in an air oven.

Extraction of Mucilage (Second Method)

In another embodiment, mucilage is alternatively extracted from fresh cactus pads as NE in which the cactus pads are washed, dried, weighed, and subsequently cut longitudinally in halves. The parenchyma (white fleshy inside) of the pads is scooped out with a spoon and pressed through a potato press to crush the parenchyma and break the mucilaginous cells thereby releasing the mucilage. Alternatively, the crushing of mucilaginous cells may be achieved with other tools, such as crushing the material with a stone or mortar and pestle.

The pressed liquid is collected, and the solids are discarded. Isopropanol is added to the liquid in a volume-to-volume ratio of 3:2 alcohol to liquid to precipitate the mucilage. The precipitate is washed with three 5 mL to 10 mL aliquots of isopropanol. The precipitate is placed on a petri dish to dry overnight and subsequently is oven dried at 50° C. overnight. The dry precipitate is then pulverized with a mortar and pestle and stored in an airtight plastic vial.

Extraction of Mucilage (Third Method)

In a further embodiment, cactus pads are washed, dried, weighed and diced into approximately 1 cm cubes. The cactus cubes are then immersed in 1% sodium chloride solution in a 1:1 mass to volume ratio. Liquid is added to the material until the solution covered the diced cactus. The mixture is boiled for 15 minutes then cooled. The liquid and solids are squeezed through a potato press and the liquid is retained while the residual solids are discarded. Isopropanol is added to the liquid in a 3:2 alcohol to liquid volume-to-volume ratio to precipitate the mucilage. The precipitate is washed with three 5 to 10 mL aliquots of isopropanol. The precipitate is placed on a petri dish to dry overnight then it is oven dried at 50° C. overnight. The dry precipitate is then pulverized with a mortar and pestle and stored in an airtight plastic vial.

Extraction of Mucilage (Fourth Method)

In a further embodiment, for the extraction of nongelling extract (NE) and gelling extract (GE), cactus pads are cleaned and boiled in milli Q water until they become tender (approximately 20 minutes). The soft pads are then liquefied in a blender. The pH of the resulting suspension is then neutralized and the solids and liquid supernatant are separated in a centrifuge at 4000 rpm. The supernatant is collected, mixed with 1M-NaCl solution (10:1 ratio), filtered and precipitated with 1:2 ratio of pulp to acetone to produce the NE extract. The acetone is then decanted and the precipitate washed with a 1:1 volume ratio of precipitate to isopropanol. The resulting NE precipitate is air dried on a watch glass at room temperature.

In order to separate the gelling portion, the centrifuged precipitates are mixed with 50 mL of 50 mM NaOH. The suspension is stirred for 10 min and the pH adjusted with HCl to 2. The suspension is centrifuged and the solids again resuspended in water while the pH is adjusted to 8 with NaOH. The suspension is then filtered and the solids are washed following the same procedure as for the NE extract.

For the combined extract, the initial blend is centrifuged and the supernatant is separated and pH adjusted to 8 with NaOH, washed with acetone and isopropanol as described above and finally it is air-dried. On average, for each pad that weighs around 300 g wet weight, a 1.5-2 g dry powder is obtained.

Use of Mucilage in Linear Configuration

The mucilage obtained by any of the described methods of extraction is blended into the soil. For a linear configuration, the mucilage may be added to the soil in a linear configuration (either vertical, diagonal, or horizontal lines), for example by injection of the mucilage into the soil. In the embodiment where the lines are horizontal, this may also be referred to as a layered configuration in which a horizontal layer of mucilage separates layers of soil.

The mucilage may be mixed with inorganic or organic compounds such as nutrients or ions/ionic compounds prior to being blended with the soil. Alternatively, inorganic or organic compounds can be added to the soil after incorporation of the mucilage. Alternatively, the nutrients or ion/ionic compounds can be present in the soil prior to mixing in the mucilage. In some embodiments, the nutrients are added to the water that is added to the system. The nutrients are transported along with the water molecules in all embodiments. Nonlimiting examples of inorganic and organic compounds include, but are not limited to, ions, macronutrients, micronutrients, fertilizers, pesticides and insecticides.

The interactions of mucilage with soil compounds is optimized and finely-controlled depending on the carrier volume and cactus mucilage concentration.

Example 4—Random Mucilage Configuration in Bio-Enriched Soil (Prophetic)

Cactus mucilage's natural ability to bind and release individual macronutrients, micronutrients and water can greatly contribute to a more sustainable agriculture by making fertilizer and water use more efficient and cost-effective.

A composition of cactus mucilage may be used which includes both gelling extract (GE) and non-gelling extract (NE) or alternatively, either GE or NE may be used individually.

Cactus mucilage can be extracted by various methods. The most common method uses water as a solvent for maceration, followed by a filtration process and precipitation. Other methods include use of a mechanical press with or without subsequent precipitation. Methods for extracting mucilage are known in the art as described in Gheribi et al., herein incorporated by reference into this disclosure. (Ghiribi, R. et al., 2019, Cactus mucilage for food packaging applications, *Coatings,* 9:655).

Extraction of Mucilage (First Method)

In an embodiment, mucilage is extracted from fresh cactus pads. The pads are washed, dried and weighed. The pads are diced or peeled and boiled for 20 min, then the mixture is liquidized in a blender. 1M sodium hydroxide (NaOH) is added to neutralize the mixture and then centrifuged to separate the supernatant (which contains the NE) from the solid precipitate (containing the GE). Before the GE is extracted, the non-gelling extract (NE) is removed. The GE is then extracted using an adaptation of a method developed by Turquois et al. (Turquois, et al. Extraction of highly gelling pectic substances from sugar beet pulp and potato pulp: influence of extrinsic parameters on their gelling properties. *Food Hydrocolloids* 1999, 13, (3), 255-262). The solids are mixed with 7.5 g/L sodium hexametaphosphate [$(NaPO_3)_6$] in 50 mM NaOH, in a 1:1 mass-to-volume ratio of solids to solution. The mixture is stirred for 1 h, then vacuum filtered with knitted polyester cloth or Whatman 41 filter paper to obtain the filtrate. The filtrate pH is lowered to 2 using hydrochloric acid (HCl) and refrigerated overnight (~ 5° C.) in order to precipitate the GE. The precipitate is separated by centrifugation, re-suspended in sufficient deionized (DI) water to cover the pellet, and the pH is adjusted to 8.0 with 1M NaOH to re-dissolve the precipitate. The resulting solution is purified by successive filtering through a 1.2 μm and a 0.45 μm membrane. The GE is re-precipitated with acetone or isopropanol in a 2:3 liquid-to-solvent volume-to-volume ratio, then is washed with alcohol and dried under ambient conditions.

The non-gelling extract (NE) is collected as described above, and sodium chloride is added to the supernatant to form a final concentration of 1M NaCl. The supernatant is filtered with knitted polyester cloth or Whatman 41 filter paper, based on the viscosity of the liquid, to obtain the filtrate. Acetone or isopropanol is added in a 2:3 volume-to-volume ratio of supernatant to solvent to precipitate the NE. The precipitate is washed with ethanol-water mixtures in a graded series (70%, 80%, 90%, 95% ethanol, and absolute ethanol) to remove any remaining impurities. The precipitate is left to dry at room temperature overnight, followed by an overnight drying in an air oven.

Extraction of Mucilage (Second Method)

In another embodiment, mucilage is alternatively extracted from fresh cactus pads as NE in which the cactus pads are washed, dried, weighed, and subsequently cut longitudinally in halves. The parenchyma (white fleshy inside) of the pads is scooped out with a spoon and pressed through a potato press to crush the parenchyma and break the mucilaginous cells thereby releasing the mucilage. Alternatively, the crushing of mucilaginous cells may be achieved with other tools, such as crushing the material with a stone or mortar and pestle.

The pressed liquid is collected and the solids are discarded. Isopropanol is added to the liquid in a volume-to-volume ratio of 3:2 alcohol to liquid to precipitate the mucilage. The precipitate is washed with three 5 mL to 10 mL aliquots of isopropanol. The precipitate is placed on a petri dish to dry overnight and subsequently is oven dried at 50° C. overnight. The dry precipitate is then pulverized with a mortar and pestle and stored in an airtight plastic vial.

Extraction of Mucilage (Third Method)

In a further embodiment, cactus pads are washed, dried, weighed and diced into approximately 1 cm cubes. The cactus cubes are then immersed in 1% sodium chloride solution in a 1:1 mass to volume ratio. Liquid is added to the material until the solution covered the diced cactus. The mixture is boiled for 15 minutes then cooled. The liquid and solids are squeezed through a potato press and the liquid is retained while the residual solids are discarded. Isopropanol is added to the liquid in a 3:2 alcohol to liquid volume-to-volume ratio to precipitate the mucilage. The precipitate is washed with three 5 to 10 mL aliquots of isopropanol. The precipitate is placed on a petri dish to dry overnight then it is oven dried at 50° C. overnight. The dry precipitate is then pulverized with a mortar and pestle and stored in an airtight plastic vial.

Extraction of Mucilage (Fourth Method)

In a further embodiment, for the extraction of nongelling extract (NE) and gelling extract (GE), cactus pads are cleaned and boiled in milli Q water until they become tender (approximately 20 minutes). The soft pads are then liquefied in a blender. The pH of the resulting suspension is then neutralized and the solids and liquid supernatant are separated in a centrifuge at 4000 rpm. The supernatant is collected, mixed with 1M-NaCl solution (10:1 ratio), filtered and precipitated with 1:2 ratio of pulp to acetone to produce the NE extract. The acetone is then decanted and the precipitate washed with a 1:1 volume ratio of precipitate to isopropanol. The resulting NE precipitate is air dried on a watch glass at room temperature.

In order to separate the gelling portion, the centrifuged precipitates are mixed with 50 mL of 50 mM NaOH. The suspension is stirred for 10 min and the pH adjusted with HCl to 2. The suspension is centrifuged and the solids again resuspended in water while the pH is adjusted to 8 with NaOH. The suspension is then filtered and the solids are washed following the same procedure as for the NE extract.

For the combined extract, the initial blend is centrifuged and the supernatant is separated and pH adjusted to 8 with NaOH, washed with acetone and isopropanol as described above and finally it is air-dried. On average, for each pad that weighs around 300 g wet weight, a 1.5-2 g dry powder is obtained.

Use of Mucilage in Random Configuration

The mucilage obtained by any of the described methods of extraction is added to the soil. For a random configuration, the mucilage may be added to the soil with no distinct pattern, for example by blending or mixing of the mucilage into the soil. This configuration is the easiest to achieve as the mucilage is mixed with the soil.

The mucilage may be mixed with inorganic or organic compounds such as nutrients or ions/ionic compounds prior to being blended with the soil. Alternatively, inorganic or organic compounds can be added to the soil after incorporation of the mucilage. Alternatively, the nutrients or ion/ionic compounds can be present in the soil prior to mixing in the mucilage. In some embodiments, the nutrients are added to the water that is added to the system. The nutrients are transported along with the water molecules by the mucilage in all embodiments. Nonlimiting examples of inorganic and organic compounds include, but are not limited to, ions, macronutrients, micronutrients, fertilizers, pesticides and insecticides.

The interactions of mucilage with soil compounds is optimized and finely-controlled depending on the carrier volume and cactus mucilage concentration.

Example 5-3D Mucilage Configuration in Bio-Enriched Soil (Prophetic)

Cactus mucilage's natural ability to bind and release individual macronutrients, micronutrients and water can greatly contribute to a more sustainable agriculture by making fertilizer and water use more efficient and cost-effective.

A composition of cactus mucilage may be used which includes both gelling extract (GE) and non-gelling extract (NE) or alternatively, either GE or NE may be used individually.

Cactus mucilage can be extracted by various methods. The most common method uses water as a solvent for maceration, followed by a filtration process and precipitation. Other methods include use of a mechanical press with or without subsequent precipitation. Methods for extracting mucilage are known in the art as described in Gheribi et al., herein incorporated by reference into this disclosure. (Ghiribi, R. et al., 2019, Cactus mucilage for food packaging applications, *Coatings,* 9:655).

Extraction of Mucilage (First Method)

In an embodiment, mucilage is extracted from fresh cactus pads. The pads are washed, dried and weighed. The pads are diced or peeled and boiled for 20 min, then the mixture is liquidized in a blender. 1M sodium hydroxide (NaOH) is added to neutralize the mixture and then centrifuged to separate the supernatant (which contains the NE) from the solid precipitate (containing the GE). Before the GE is extracted, the non-gelling extract (NE) is removed. The GE is then extracted using an adaptation of a method developed by Turquois et al. (Turquois, et al. Extraction of highly gelling pectic substances from sugar beet pulp and potato pulp: influence of extrinsic parameters on their gelling properties. *Food Hydrocolloids* 1999, 13, (3), 255-262). The solids are mixed with 7.5 g/L sodium hexametaphosphate [$(NaPO_3)_6$] in 50 mM NaOH, in a 1:1 mass-to-volume ratio of solids to solution. The mixture is stirred for 1 h, then vacuum filtered with knitted polyester cloth or Whatman 41 filter paper to obtain the filtrate. The filtrate pH is lowered to 2 using hydrochloric acid (HCl) and refrigerated overnight (~ 5° C.) in order to precipitate the GE. The precipitate is separated by centrifugation, re-suspended in sufficient deionized (DI) water to cover the pellet, and the pH is adjusted to 8.0 with 1M NaOH to re-dissolve the precipitate. The resulting solution is purified by successive filtering through a 1.2 μm and a 0.45 μm membrane. The GE is re-precipitated with acetone or isopropanol in a 2:3 liquid-to-solvent volume-to-volume ratio, then is washed with alcohol and dried under ambient conditions.

The non-gelling extract (NE) is collected as described above, and sodium chloride is added to the supernatant to form a final concentration of 1M NaCl. The supernatant is filtered with knitted polyester cloth or Whatman 41 filter paper, based on the viscosity of the liquid, to obtain the filtrate. Acetone or isopropanol is added in a 2:3 volume-to-volume ratio of solvent to supernatant to precipitate the NE. The precipitate is washed with ethanol-water mixtures in a graded series (70%, 80%, 90%, 95% ethanol, and absolute ethanol) to remove any remaining impurities. The precipitate is left to dry at room temperature overnight, followed by an overnight drying in an air oven.

Extraction of Mucilage (Second Method)

In another embodiment, mucilage is alternatively extracted from fresh cactus pads as NE in which the cactus pads are washed, dried, weighed, and subsequently cut longitudinally in halves. The parenchyma (white fleshy inside) of the pads is scooped out with a spoon and pressed through a potato press to crush the parenchyma and break the mucilaginous cells thereby releasing the mucilage. Alternatively, the crushing of mucilaginous cells may be achieved with other tools, such as crushing the material with a stone or mortar and pestle.

The pressed liquid is collected and the solids are discarded. Isopropanol is added to the liquid in a volume-to-volume ratio of 3:2 alcohol to liquid to precipitate the mucilage. The precipitate is washed with three 5 mL to 10 mL aliquots of isopropanol. The precipitate is placed on a petri dish to dry overnight and subsequently is oven dried at 50° C. overnight. The dry precipitate is then pulverized with a mortar and pestle and stored in an airtight plastic vial.

Extraction of Mucilage (Third Method)

In a further embodiment, cactus pads are washed, dried, weighed and diced into approximately 1 cm cubes. The cactus cubes are then immersed in 1% sodium chloride solution in a 1:1 mass to volume ratio. Liquid is added to the material until the solution covered the diced cactus. The mixture is boiled for 15 minutes then cooled. The liquid and solids are squeezed through a potato press and the liquid is retained while the residual solids are discarded. Isopropanol is added to the liquid in a 3:2 alcohol to liquid volume-to-volume ratio to precipitate the mucilage. The precipitate is washed with three 5 to 10 mL aliquots of isopropanol. The precipitate is placed on a petri dish to dry overnight then it is oven dried at 50° C. overnight. The dry precipitate is then pulverized with a mortar and pestle and stored in an airtight plastic vial.

Extraction of Mucilage (Fourth Method)

In a further embodiment, for the extraction of nongelling extract (NE) and gelling extract (GE), cactus pads are cleaned and boiled in milli Q water until they become tender (approximately 20 minutes). The soft pads are then liquefied in a blender. The pH of the resulting suspension is then neutralized and the solids and liquid supernatant are separated in a centrifuge at 4000 rpm. The supernatant is collected, mixed with 1M-NaCl solution (10:1 ratio), filtered and precipitated with 1:2 ratio of pulp to acetone to produce the NE extract. The acetone is then decanted and the precipitate washed with a 1:1 volume ratio of precipitate to isopropanol. The resulting NE precipitate is air dried on a watch glass at room temperature.

In order to separate the gelling portion, the centrifuged precipitates are mixed with 50 mL of 50 mM NaOH. The suspension is stirred for 10 min and the pH adjusted with HCl to 2. The suspension is centrifuged and the solids again resuspended in water while the pH is adjusted to 8 with NaOH. The suspension is then filtered and the solids are washed following the same procedure as for the NE extract.

For the combined extract, the initial blend is centrifuged and the supernatant is separated and pH adjusted to 8 with NaOH, washed with acetone and isopropanol as described above and finally it is air-dried. On average, for each pad that weighs around 300 g wet weight, a 1.5-2 g dry powder is obtained.

Use of Mucilage in 3D Configuration

The mucilage obtained by any of the described methods of extraction is added to the soil. For a 3D configuration, the mucilage may be added to the soil in vertical and horizontal lines, for example by injection of the mucilage into the soil. This configuration has more access points of contact between mucilage and soil. It also has more control on the regions that may need more water to water.

If used in a soil container, mucilage solutions are running vertically at first from top to bottom, and then the soil container is rotated to run mucilage from top to bottom on the horizontal side. It is necessary to have the soil containers at enough pressure that the mucilage gets injected within the soil on straight vertical or horizontal lines as a result of the rotation The mucilage may be mixed with inorganic or organic compounds such as nutrients or ions/ionic compounds prior to being blended with the soil. Alternatively, inorganic or organic compounds can be added to the soil after incorporation of the mucilage. Alternatively, the nutrients or ion/ionic compounds can be present in the soil prior to mixing in the mucilage. In some embodiments, the nutrients are added to the water that is added to the system. The nutrients are transported along with the water molecules by the mucilage in all embodiments. Nonlimiting examples of inorganic and organic compounds include, but are not limited to, ions, macronutrients, micronutrients, fertilizers, pesticides and insecticides.

The interactions of mucilage with soil compounds is optimized and finely-controlled depending on the carrier volume and cactus mucilage concentration.

Conclusion

The inclusion of cactus mucilage as well as inorganic and organic molecules in soil produces a superior soil that is capable of retaining and providing nutrients and water efficiently.

The disclosures of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of enhancing soil by modulating water and nutrient availability in the soil comprising:
   measuring moisture in the soil to determine soil water balance;
   measuring a surface tension of the soil and decreasing the surface tension of the soil to below about 72 mN/m if the surface tension of the soil as measured is equal to or above 72 mN/m;
   modeling soil environment using a COMSOL® model to determine changes in the soil water balance in response to adding cactus mucilage to the soil;
   adding an amount of cactus mucilage to the soil based on results obtained in the COMSOL model; and
   subsequently adding an amount of at least one inorganic compound to the soil to produce a bio-enriched soil.

2. The method of claim 1, wherein the at least one inorganic compound is at least one macronutrient, at least one micronutrient, or combinations thereof.

3. The method of claim 1, wherein the cactus mucilage is obtained from *Opuntia ficus indica* (OFI).

4. The method of claim 1, wherein the cactus mucilage is present in the bio-enriched soil in a random configuration.

5. The method of claim 1, wherein the cactus mucilage is present in the bio-enriched soil in a linear or a three-dimensional (3D) configuration.

6. A method of modulating water and nutrient availability in soil comprising:
   measuring moisture in the soil to determine soil water balance;
   measuring a surface tension of the soil and decreasing the surface tension of the soil to below about 72 mN/m if the surface tension of the soil as measured is equal to or above 72 mN/m;
   modeling soil environment using a COMSOL® model to determine changes in the soil water balance in response to adding cactus mucilage to the soil;
   adding an amount of cactus mucilage to the soil based on results obtained in the COMSOL model; and
   subsequently adding at least one nutrient to the soil to produce a bio-enriched soil;
   wherein the cactus mucilage stores or releases the water and the at least one nutrient in response to soil conditions.

7. The method of claim 6, wherein the cactus mucilage is obtained from *Opuntia ficus indica* (OFI).

8. The method of claim 6, wherein the cactus mucilage is present in the bio-enriched soil in a linear configuration.

9. The method of claim 6, wherein the cactus mucilage is present in the bio-enriched soil in a random configuration.

10. The method of claim 6, wherein the cactus mucilage is present in the bio-enriched soil in a three-dimensional (3D) configuration.

\* \* \* \* \*